United States Patent
Grip et al.

(10) Patent No.: US 12,404,024 B2
(45) Date of Patent: Sep. 2, 2025

(54) SYSTEMS AND METHODS FOR SECURING CARGO CONTAINERS

(71) Applicant: THE BOEING COMPANY, Chicago, IL (US)

(72) Inventors: Robert E. Grip, Rancho Palos Verdes, CA (US); John Joseph Brown, Costa Mesa, CA (US); Michael S. Karapetian, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 653 days.

(21) Appl. No.: 17/855,208

(22) Filed: Jun. 30, 2022

(65) Prior Publication Data
US 2024/0002054 A1 Jan. 4, 2024

(51) Int. Cl.
| | | |
|---|---|---|
| *B64D 9/00* | (2006.01) | |
| *B60K 15/05* | (2006.01) | |
| *B60P 7/13* | (2006.01) | |
| *B60R 25/021* | (2013.01) | |
| *B61D 45/00* | (2006.01) | |
| *B65D 90/00* | (2006.01) | |
| *B66C 1/66* | (2006.01) | |

(52) U.S. Cl.
CPC .............. *B64D 9/003* (2013.01); *B60P 7/132* (2013.01); *B61D 45/007* (2013.01); *B65D 90/0006* (2013.01); *B66C 1/663* (2013.01); *B60K 2015/0584* (2013.01); *B60R 25/02123* (2013.01)

(58) Field of Classification Search
CPC .... B64D 9/003; B65D 85/62; B65D 90/0006; B61D 45/007; B60P 7/132; B66C 1/663
USPC ........... 410/77; 206/456, 504, 509; 446/124; 220/23.4
See application file for complete search history.

(56) References Cited

U.S. PATENT DOCUMENTS

| | | | | |
|---|---|---|---|---|
| 3,980,185 | A * | 9/1976 | Cain | ..................... B65D 88/022 |
| | | | | 206/509 |
| 2003/0164375 | A1 | 9/2003 | Neufingerl | |
| 2006/0049075 | A1 * | 3/2006 | Chen | .................. A47B 87/0292 |
| | | | | 206/504 |
| 2009/0307877 | A1 | 12/2009 | Boman | |

FOREIGN PATENT DOCUMENTS

| | | |
|---|---|---|
| CN | 205418648 | 8/2016 |
| CN | 105691965 | 1/2018 |
| CN | 105292835 | 1/2019 |
| DE | 102004016275 | 10/2005 |
| DE | 202006007097 | 8/2006 |
| EP | 832827 | 12/2001 |

\* cited by examiner

*Primary Examiner* — Steven O Douglas
(74) *Attorney, Agent, or Firm* — Joseph M. Butscher; The Small Patent Law Group LLC

(57) ABSTRACT

A securing lock for a cargo support apparatus includes one or more first locking interfaces. The one or more first locking interfaces include a tooth assembly including one or more teeth, and a jaws assembly including one or more jaws. The one or more teeth are configured to be engaged by one or more other jaws of a second locking interface of at least one other container to secure the container to the at least one other container. The one or more jaws are configured to engage one or more other teeth of the second locking interface of the at least one other container to secure the container to the at least one other container.

20 Claims, 15 Drawing Sheets

SYSTEMS AND METHODS FOR SECURING CARGO CONTAINERS

FIELD OF THE DISCLOSURE

Examples of the present disclosure generally relate to systems and methods for securing containers together, and more particularly to containers, such as cargo containers, having locking connectors.

BACKGROUND OF THE DISCLOSURE

Cargo containers are moved about the world by various types of vehicles, such as trucks, ships, trains, and aircraft. In order to facilitate shipment of goods in a global economy, standards for shipping containers have been developed to enable intermodal shipping. So-called "ISO" containers are containers with standardized outer dimensions as well as standardized connection point locations and hardware so that containers may reliably be carried from place to place by various types of vehicles with complementary container connection equipment.

However, standardization in container size and fitting locations means that smaller containers, which may be a better fit physically and economically for various types of cargo, may not be usable with standardized container transport vehicles. Accordingly, there is a need for modular containers that come in a wider variety of sizes and that include connection features to allow agglomeration to larger containers that maintain compatibility with existing cargo container standards.

FIG. 1 illustrates a lateral view of a cargo container 10 being loaded onto an aircraft 12. Special machinery, such as a lifting cart 14, can be used to load and offload large cargo containers, such as ISO containers. However, such specialized loading and unloading machinery typically means that the aircraft 12 can only be loaded and unloaded at airports that have such equipment. Procuring and maintaining such equipment at many airports is costly and logistically complex.

Further, in general, stacking and restraining boxes or containers, such as within a cargo hold of an aircraft, is time and labor intensive. Typically, containers are strapped onto a pallet, which is then restrained to the aircraft floor.

SUMMARY OF THE DISCLOSURE

A need exists for an efficient and effective system and method for coupling cargo containers together.

With that need in mind, certain examples of the present disclosure provide a securing lock for a cargo support apparatus, such as a container. The securing lock includes one or more first locking interfaces. The one or more first locking interfaces include a tooth assembly including one or more teeth, and a jaws assembly including one or more jaws. The one or more teeth are configured to be engaged by one or more other jaws of a second locking interface of at least one other cargo support apparatus (such as another container) to secure the container to the at least one other container. The one or more jaws are configured to engage one or more other teeth of the second locking interface of the at least one other container to secure the container to the at least one other container.

In at least one example, the one or more first locking interfaces are disposed proximate to one or more corners of the container. In at least one example, the one or more locking interface are integrally formed with the container. In at least one example, the one or more locking interfaces comprise at least three locking interfaces.

The one or more locking interfaces may also include one or more protrusions and one or more recesses. The one or more protrusions and the one or more recesses are configured to cooperate with other one or more recesses and other one or more protrusions, respectively, of the second locking interface. In at least one example, the tooth assembly and the jaws assembly are inside an outer perimeter defined by the one or more protrusions and the one or more recesses.

In at least one example, the one or more locking interfaces further include a rotational spring rotationally coupled to the one or more jaws.

In at least one example, the tooth assembly further includes a piston, and a yoke coupled to the piston. The one or more teeth extend outwardly from the yoke. The one or more teeth can include serrations.

In at least one example, the jaws assembly includes an outer ring, and an inner ring. The one or more jaws radially extend between the outer ring and the inner ring. The one or more jaws can include serrations.

In at least one example, wherein the one or more teeth are disposed in one or more gaps separating neighboring jaws.

In at least one example, the securing lock further includes or more fluid sources that are configured to deliver fluid to move one or both of the tooth assembly or the jaws assembly. In at least one further example, the one or more fluid sources are configured to deliver the fluid to move both the tooth assembly and the jaws assembly. The fluid source can be one or both of a source of compressed gas, or a hydraulic fluid reservoir.

In at least one example, the container includes a teeth engagement device operatively coupled to the one or more fluid sources, and a jaws disengagement device operatively coupled to the one or more fluid sources.

In at least one example, the one or more first locking interfaces further include one or more springs that connect the one or more teeth to one or more portions of a housing.

Certain examples of the present disclosure provide a method for securing a container to at least one other container. The method includes engaging one or more teeth of a tooth assembly of one or more first locking interfaces of the container by one or more other jaws of a second locking interface of at least one other container to secure the container to the at least one other container; and engaging one or more other teeth of the second locking interface by one or more jaws of a jaws assembly of the one or more locking interface to secure the container to the at least one other container. In at least one example, the method also includes delivering fluid from one or more fluid sources to move one or both of the tooth assembly or the jaws assembly.

Certain examples of the present disclosure provide a cargo container including a securing lock including one or more first locking interfaces, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for securely coupling cargo support apparatuses together. The cargo support apparatuses can be containers, pallets, or other cargo holding devices (such as features on and/or within a floor of a cargo holding area within a vehicle). In at least one example, a self-locking apparatus enables a mini-corner fitting to be fixedly attached to corner fittings of an adjacent container. A fluid, such as compressed air or hydraulic fluid, can be used to attach and detach the apparatus.

Figure 2:
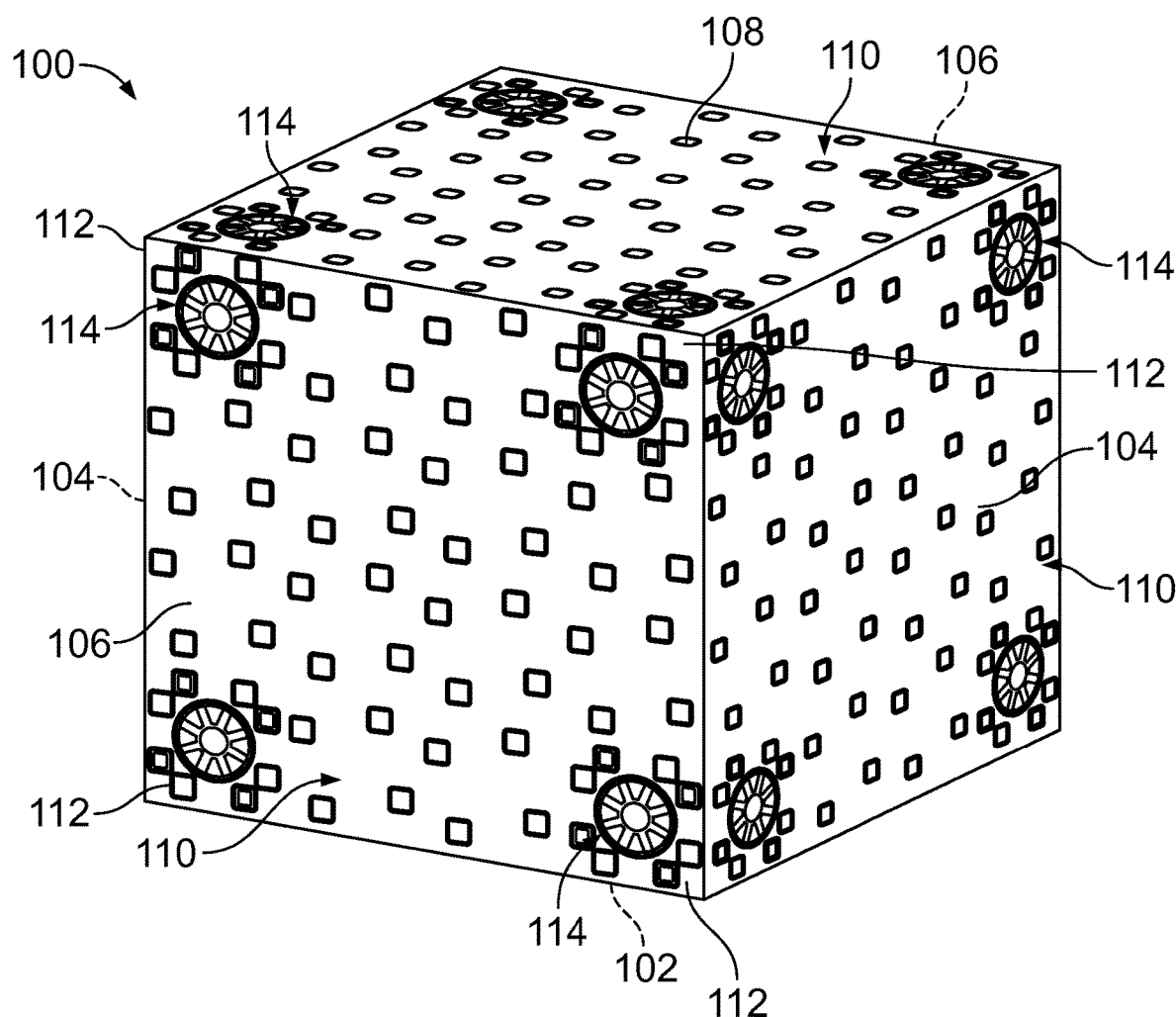
FIG. 2 illustrates an isometric view of a container, according to an example of the present disclosure.

FIG. 2 illustrates an isometric view of a container 100, according to an example of the present disclosure. The container 100 is an example of a cargo holding apparatus. Examples of the present disclosure can be used with various other cargo holding apparatuses, such as pallets, features on and/or within a floor of a cargo holding area within a vehicle, and/or the like. In at least one example, the container 100 is a cargo container, such as be loaded and unloaded in relation to a vehicle, such as an aircraft, truck, train, ship, or the like. In at least one other example, the container 100 can be various other types of structures configured to retain one or more items, such as a storage bin, product box, and/or the like. The container 100 can be a box, for example.

The container 100 includes a bottom wall 102 connected to upstanding side walls 104, and end walls 106. The side walls 104 are parallel with one another, and perpendicular to the end walls 106. The end walls 106 are parallel with one another, and perpendicular to the side walls 104. The side walls 104 and end walls 106 also connect to a top wall 108, which is parallel with the bottom wall 102. The side walls 104 and end walls 106 are orthogonal to the bottom wall 102 and the top wall 108. As shown, the container 100 can be shaped as a cube, such that each of the bottom wall 102, the side walls 104, the end walls 106, and the top wall 108 are the same size. Optionally, the container 100 can be elongated in one or more directions, such that the container 100 is not cubic.

Each of the bottom wall 102, the side walls 104, the end walls 106, and the top wall 108 provides a face 110. Each face 110 has a plurality of corners 112. For example, each face 110 has four corners 112. A securing lock 114 is located proximate to each corner 112. For example, a securing lock 114 can be at the corner, inset from the corner (such as within 2 inches or less of edges defining the corner 112), and/or the like. As shown in FIG. 2, each face 110 has a securing lock 114 proximate to each corner 112. Optionally, a securing lock 114 may not be located proximate to each corner 112. For example, one or more securing locks 114 can be at the center of a face, or proximate thereto.

Figure 3:
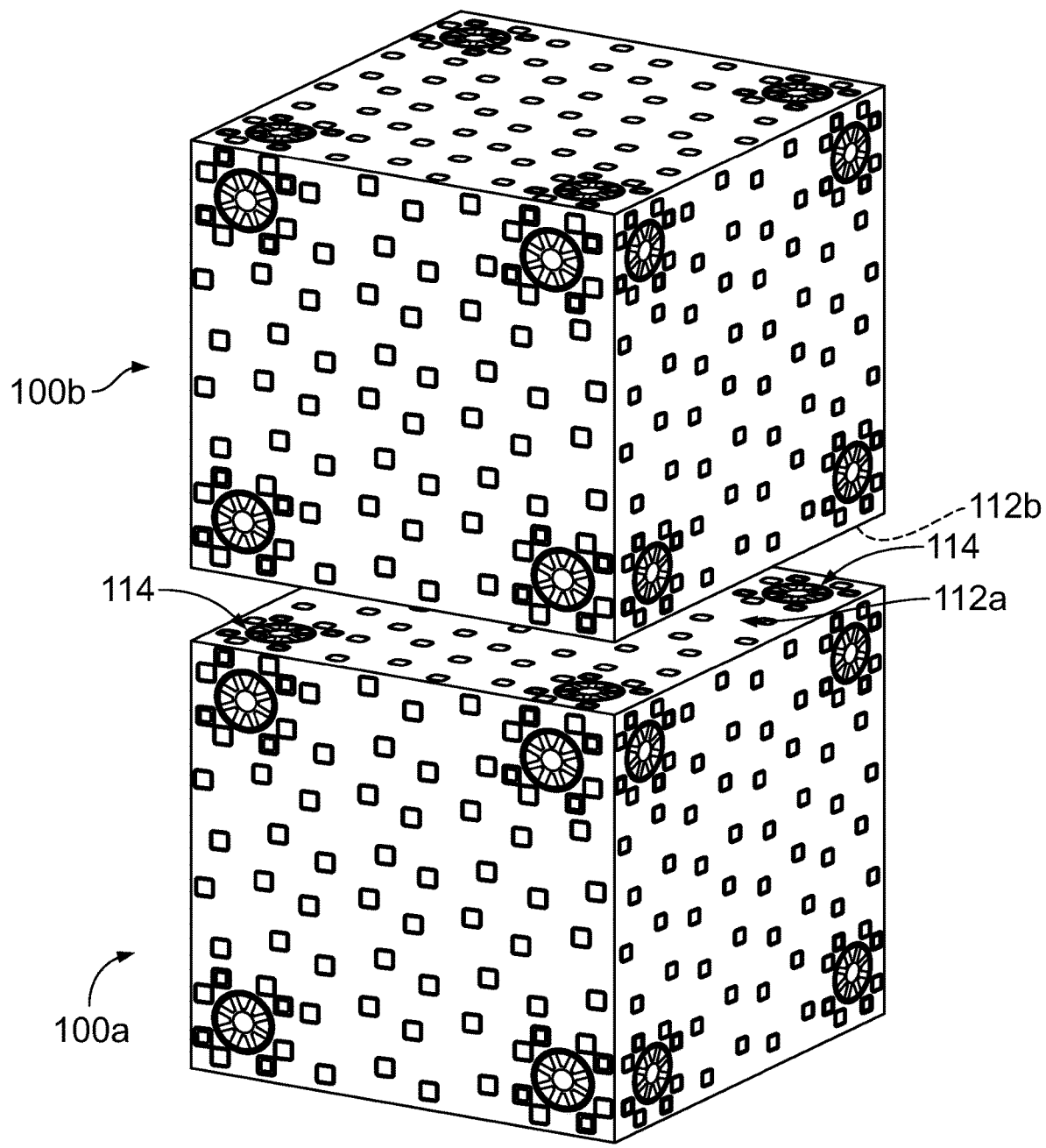
FIG. 3 illustrates an isometric view of a first container disposed above a second container, according to an example of the present disclosure.
Figure 4:
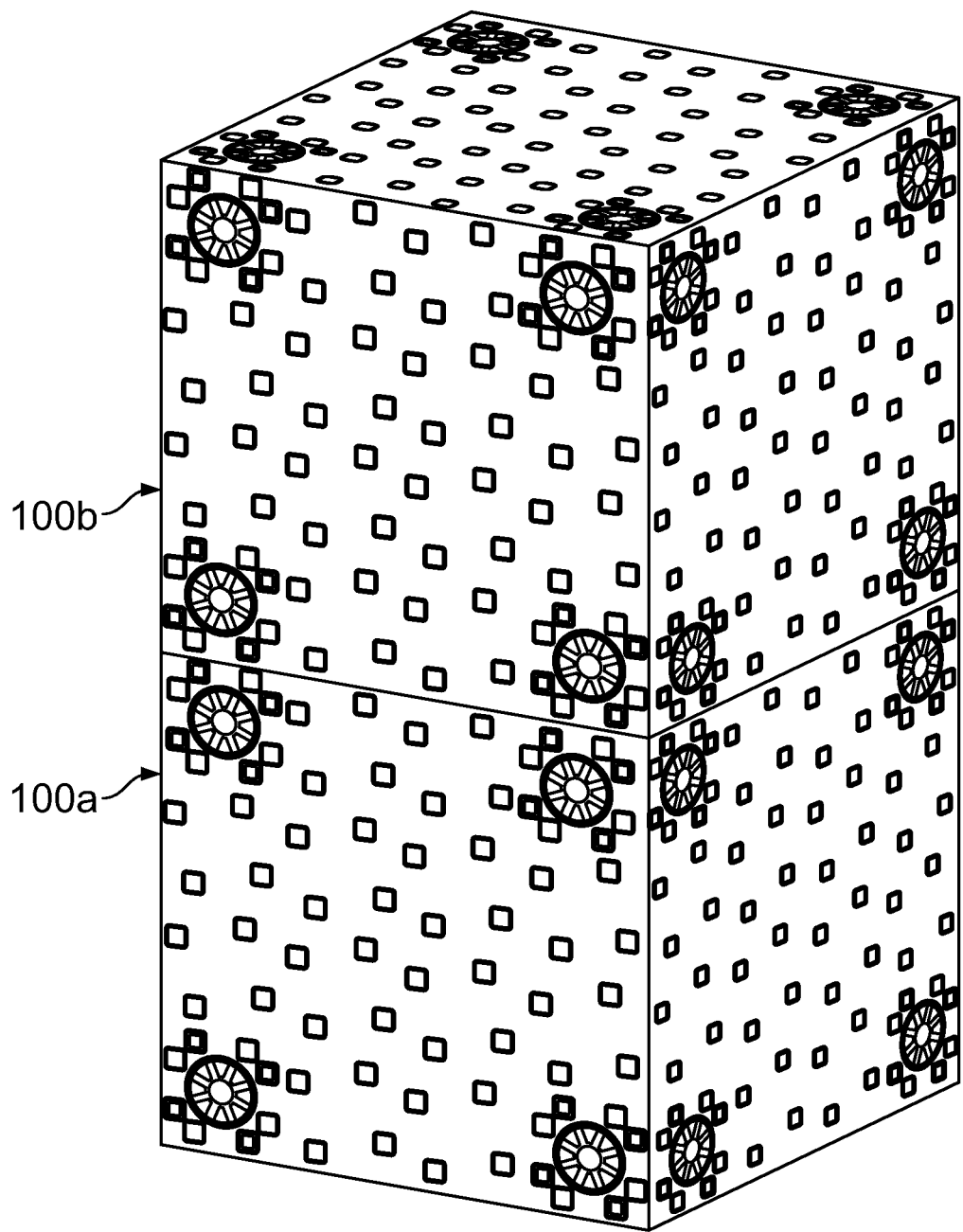
FIG. 4 illustrates an isometric view of the first container secured to the second container.

FIG. 3 illustrates an isometric view of a first container 100a disposed above a second container 100b, according to an example of the present disclosure. FIG. 4 illustrates an isometric view of the first container 100a secured to the second container 100b. Referring to FIGS. 3 and 4, each of the first container 100a and the second container 100b can be sized, shaped, and configured the same. In at least one example, each of the first container 100a and the second container 100b is sized, shaped, and configured as shown in FIG. 2. As described herein, the securing locks 114 on a first face 112a of the first container 100a are configured to securely and locking mate with securing locks 114 on a second face 112b of the second container 100b in order to efficiently and effectively secure the first container 100a to the second container 100b.

Figure 1:
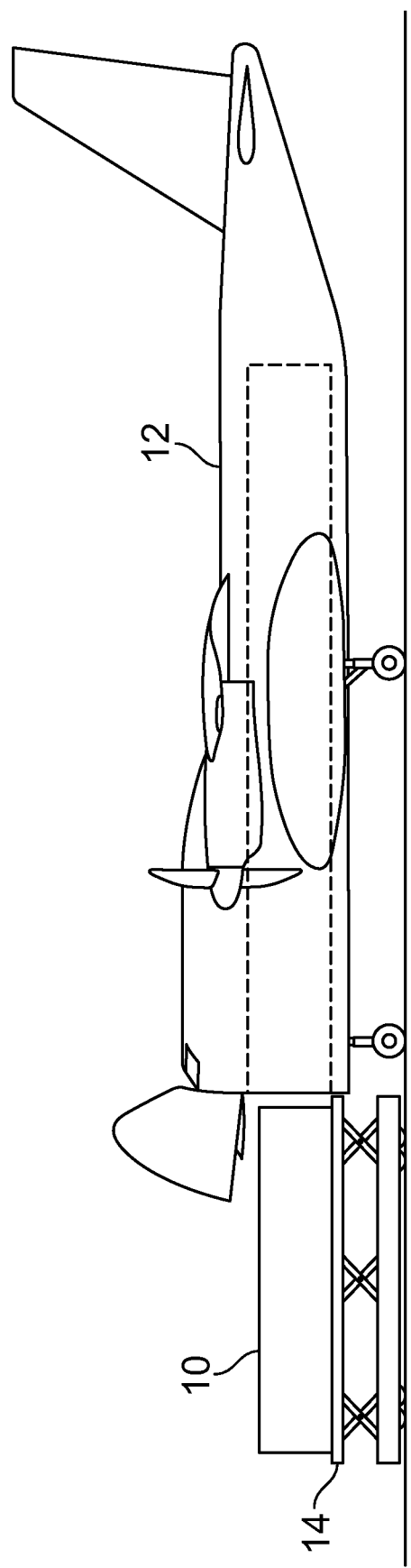
FIG. 1 illustrates a lateral view of a cargo container being loaded onto an aircraft.
Figure 5:
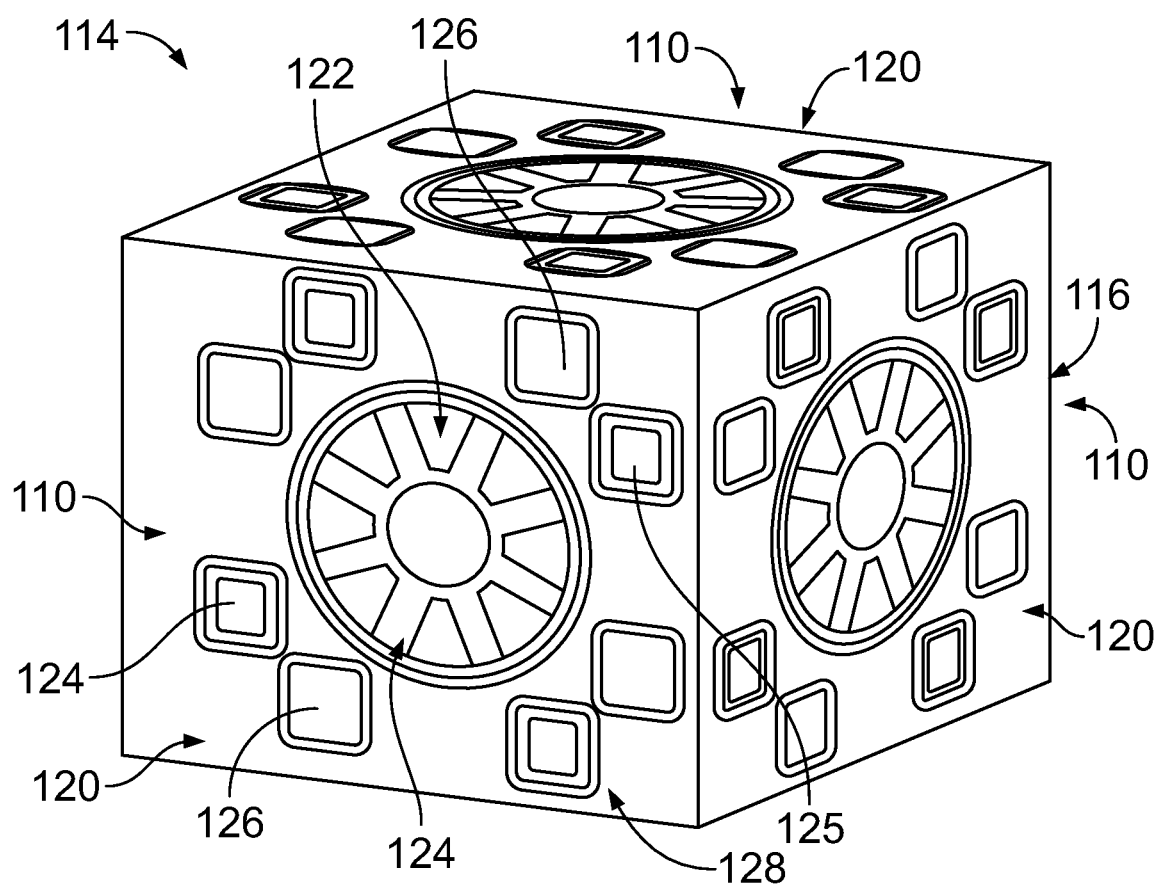
FIG. 5 illustrates an isometric view of a securing lock, according to an example of the present disclosure.

FIG. 5 illustrates an isometric view of a securing lock 114, according to an example of the present disclosure. The securing lock 114 includes a housing 116 that is coupled to the container 100, as shown in FIG. 1. The housing 116 can be separately connected to the container 100. Optionally, the housing 116 can be integrally formed with the container 100. As shown, the securing lock 114 can include a plurality of locking interfaces 120. For example, a first locking interface 120 can be at a first corner of a first face 110, a second locking interface 120 can be at a second corner of a second face 110, and a third locking interface 120 can be at a third corner of a third face 110. Optionally, the securing lock 114 can include fewer locking interfaces 120 than shown. For example, the securing lock 114 can include a single locking interface 120 at one corner of one face 110.

Each locking interface 120 includes a tooth assembly 122 and a jaws assembly 124. In at least one example, the locking interfaces 120 can also include a plurality of first connector elements or protrusions 125 (such as pads) and second connector elements or recesses 126. The protrusions 125 and the recesses 126 are outboard from the tooth assembly 122 and the jaws assembly 124. As shown, the locking interface 120 can include four protrusions 125 and four recesses 126 in a rotationally symmetrical pattern. The tooth assembly 122 and the jaws assembly 124 are inside an outer perimeter 128 defined by the protrusions 125 and the recesses 126. When a locking interface 120 couples with another locking interface 120, the protrusions 125 of the locking interface 120 are retained within the recesses 126 of the other locking interface 120. The recesses 126 are configured to receive and retain the protrusions 125. In at least one example, the protrusions 125 and recesses 126 are described in U.S. Pat. No. 11,299,341, entitled "Modular Cargo Container with Surface Connectors," which is hereby incorporated by reference in its entirety. The protrusions 125 mate with the recesses 126 of another locking interface 120. The interlocking protrusions 125 and the recesses 126 enable two different interfacing locking interfaces 120 to transfer shear forces efficiently. The locking interface 120 can include more or fewer protrusions 125 and recesses 126 than shown in FIG. 5. In at least one example, the locking interface 120 may not include the protrusions and/or the recesses. For example, the locking interface 120 can include only the tooth assembly 122 and the jaws assembly 124.

Figure 6:
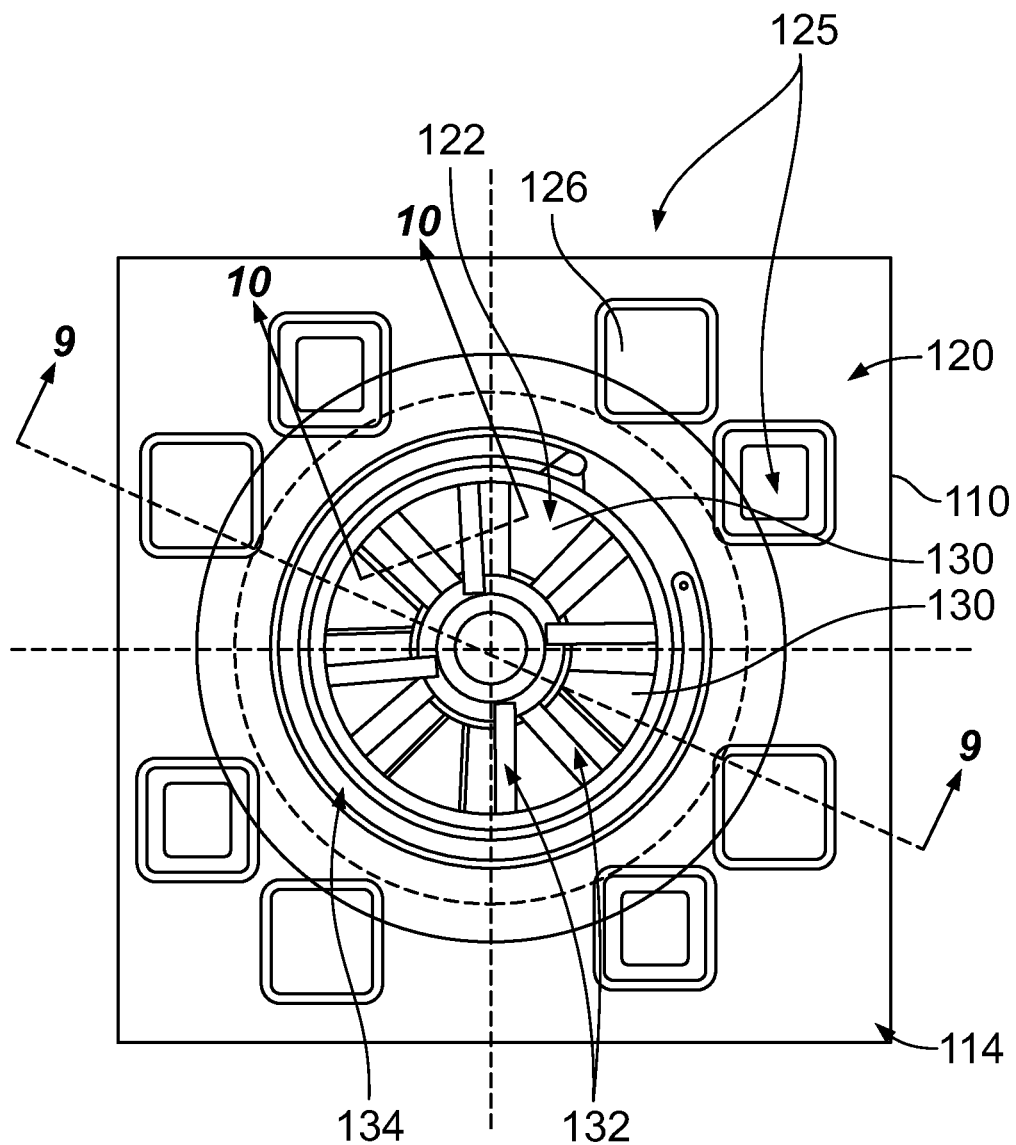
FIG. 6 illustrates a front view of a locking interface of the securing locking, according to an example of the present disclosure.

FIG. 6 illustrates a front view of a locking interface 120 of the securing lock 114, according to an example of the present disclosure. The locking interface 120 includes the tooth assembly 122, which includes one or more teeth 130, and the jaws assembly 124, which includes one or more jaws 132. A rotational spring 134 can be rotationally coupled to the jaws 132.

Figure 7:
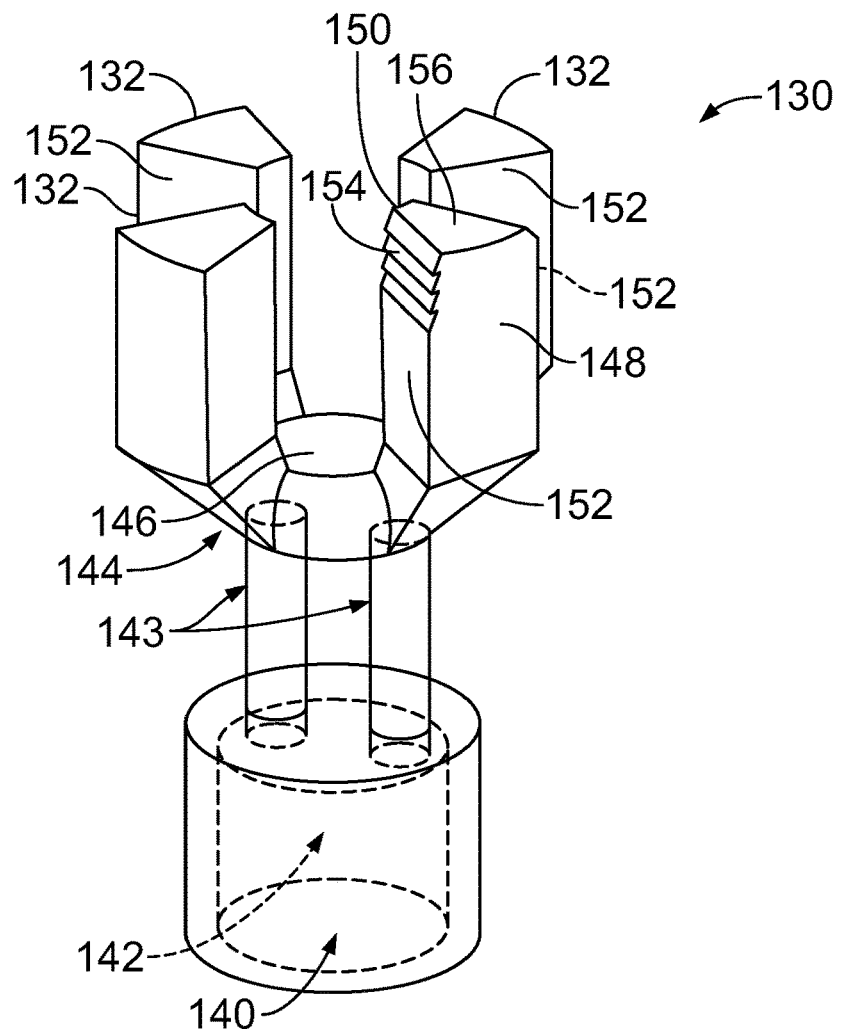
FIG. 7 illustrates an isometric view of a tooth assembly, according to an example of the present disclosure.

FIG. 7 illustrates an isometric view of a tooth assembly 122, according to an example of the present disclosure. Referring to FIGS. 5-7, the tooth assembly 122 is retained on and/or within the housing 116. In at least one example, the tooth assembly 122 includes a base cylinder 140 that retains an internal piston 142. One or more rods 143 extend from the piston 142 (and/or the base cylinder 140). A yoke 144 connects to the one or more rods 143 opposite from the base cylinder 140. The yoke 144 includes a central bearing stop 146. One or more teeth 130 extend outwardly from the yoke 144 around the central bearing stop 146.

Each tooth 130 includes an outer surface 148 that connects to an inner surface 150. The inner surface 150 can be tapered in relation to the outer surface 148. That is, the tooth 130 may taper down from the outer surface 148 to the inner surface 150. The tooth 130 also includes lateral edges 152 that extend between the outer surface 148 and the inner surface 150. At least a portion of one or more of the lateral edges 152 can include serrations 154. In at least one example, each of the lateral edges 152 can include the serrations 154. The serrations 154 may extend over an entirety of the lateral edges 152. Optionally, the serrations 154 may extend over less than half of a lateral edge 152, such as proximate to an outer end 156. In at least one example, all of the lateral edges 152 include serrations 154. In at least one other example, less than all of the lateral edges 152 include serrations 154.

As shown, the tooth assembly 122 may include two rods 143 and four regularly spaced teeth 130. Optionally, the tooth assembly 122 can include more or fewer then two rods 143, and more or fewer than four teeth 130. In at least one example, the tooth assembly 122 includes a single rod 143. As another example, the tooth assembly 122 may not include any rods. For example, the base cylinder 140 can integrally connect with the yoke 144. As another example, the piston 142 may integrally connect with the yoke 144 without a base cylinder. As another example, the tooth assembly 122 can include two teeth 130. As another example, the tooth assembly 122 can include only a single tooth 130.

Figure 8:
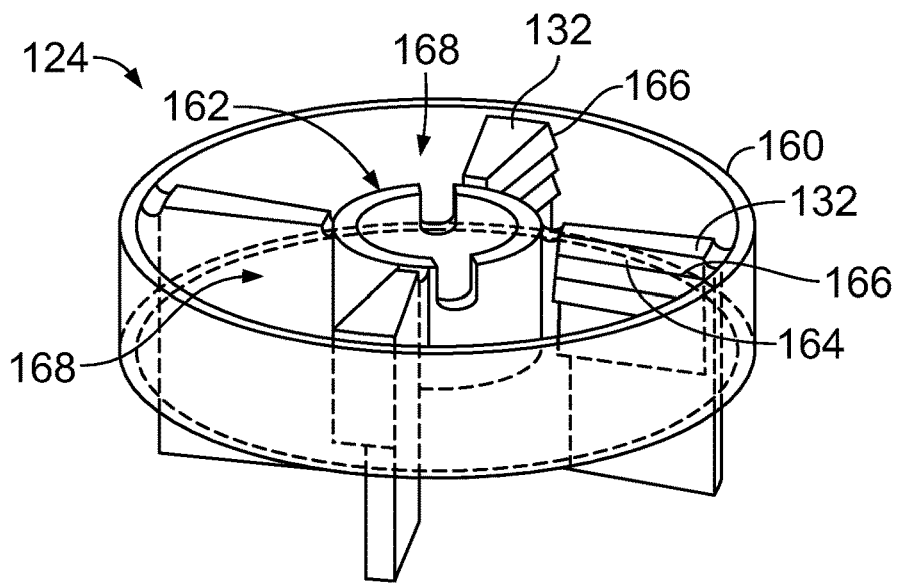
FIG. 8 illustrates an isometric view of a portion of a jaws assembly, according to an example of the present disclosure.

FIG. 8 illustrates an isometric view of a portion of the jaws assembly 124 (for example, an upper half), according to an example of the present disclosure. Referring to FIGS. 5-8, the tooth assembly 124 is retained on and/or within the housing 116. In at least one example, the jaws assembly 124 includes an outer ring 160 and an inner ring 162. One or more jaws 132 radially extend between the outer ring 160 and the inner ring 162. The jaws 132 are wedge shaped, and taper down from the outer ring 160 to the inner ring 162. Lateral faces 166 of the jaws 132 can include serrations 164. Each jaw 132 is configured to mate with a tooth 130 of a tooth assembly 122 of another securing lock 114.

The jaws assembly 124 can include more or fewer jaws 132 than shown. Each of the jaws 132 can include serrations 164. The serrations 164 can be on each lateral face 166 of a jaw 132, or just on lateral face 166. Optionally, less than all of the jaws 132 can include serrations 164.

The teeth 130 are disposed in gaps 168 between neighboring jaws 132. The spring 134 rotationally biases the jaws assembly 124 in relation to the housing 116. For example, the spring 134 is coupled to the jaws assembly 124, such as around a portion of the outer ring 160, and to a fixed portion of the housing 116. Optionally, the securing lock 114 may not include the spring.

Figure 10:
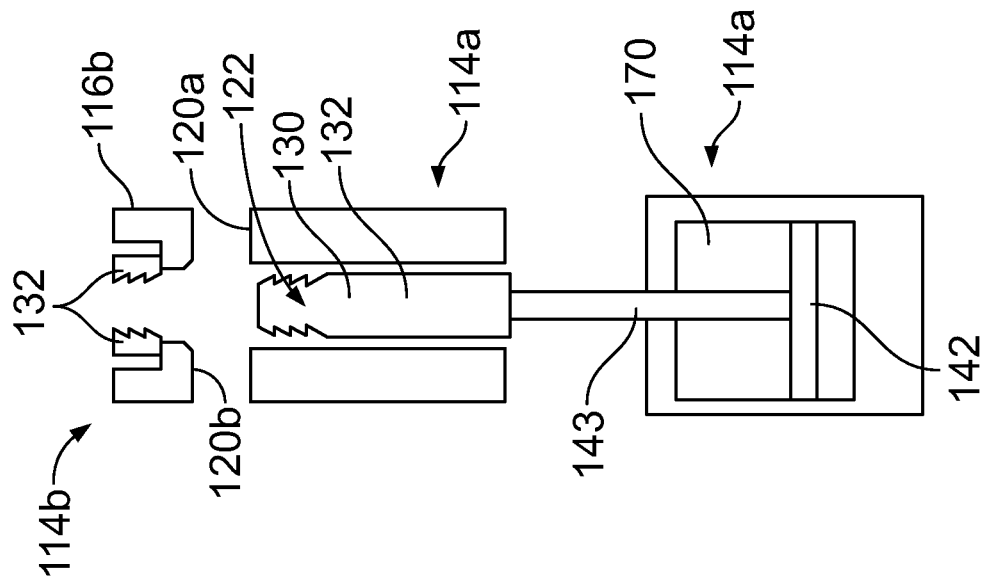
FIG. 10 illustrates a cross-sectional view of a first locking interface of a first securing lock through line 10-10 of FIG. 6 separated from a second locking interface of a second securing lock, according to an example of the present disclosure.
Figure 9:
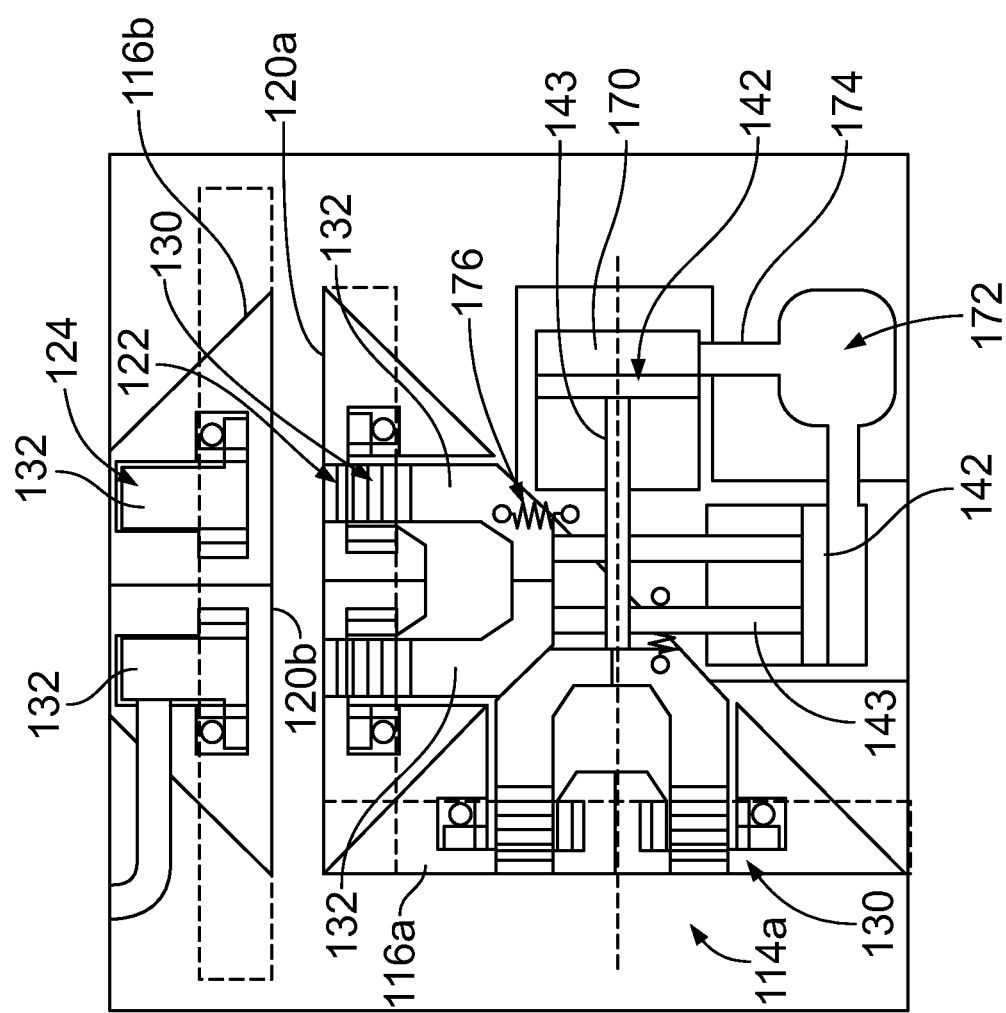
FIG. 9 illustrates a cross-sectional view of a first locking interface of a first securing lock through line 9-9 of FIG. 6 separated from a second locking interface of a second securing lock, according to an example of the present disclosure.

FIG. 9 illustrates a cross-sectional view of a first locking interface 120a of a first securing lock 114a through line 9-9 of FIG. 6 separated from a second locking interface 120b of a second securing lock 114b, according to an example of the present disclosure. FIG. 10 illustrates a cross-sectional view of the first locking interface 120a of the first securing lock 114a through line 10-10 of FIG. 6 separated from the second locking interface 120b of the second securing lock 114b. Referring to FIGS. 9 and 10, the piston 142 of each tooth assembly 122 is retained within a fluid chamber 170, such as can be defined within the housing 116a and/or the base cylinder 140 (shown in FIG. 7). The fluid chamber 170 is in fluid communication with a fluid source 172, such as through one or more fluid conduits 174 (such as pipes, tubes, ducts, and/or the like). The fluid conduits 174 may be integrally formed within the housing 116a (and 116b). The fluid source 172 can be a container of compressed air, hydraulic fluid reservoir, and/or the like. The fluid source 172 can be retained within the housing 116a (and/or 116b). Optionally, the fluid source 172 can be outside of the housing 116a and 116b and connected to the fluid conduits 174 through a fluid inlet formed on and/or within the housing 116a and/or 116b. One or more springs 176, such as coil springs, can connect one or more of the teeth 130 to internal portions of the housing 116a (and 116b).

Referring to FIGS. 5-10, in order to mate the first locking interface 120a with the second locking interface 120b, protrusions 125 of each of the first locking interface 120 and the second locking interface 120b are aligned with counterpart recesses 126, so that the jaw assembly 124 of the locking interface 120b aligns with the tooth assembly 122 of the locking interface 120a. In at least one example, the stiffness of the protrusions 125 is configured such that when compressed into the recesses 126, a pre-stress tension is provided when the jaws 132 of the second locking interface 120b engage the teeth 130 of the first locking interface 120a.

Figure 12:
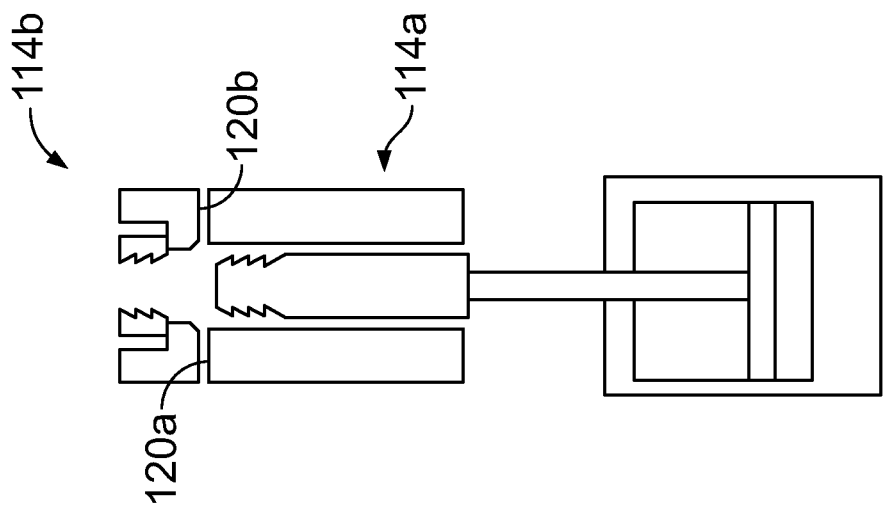
FIG. 12 illustrates a cross-sectional view of the first locking interface of the first securing lock through line 10-10 of FIG. 6 abutting the second locking interface of the second securing lock, according to an example of the present disclosure.
Figure 11:
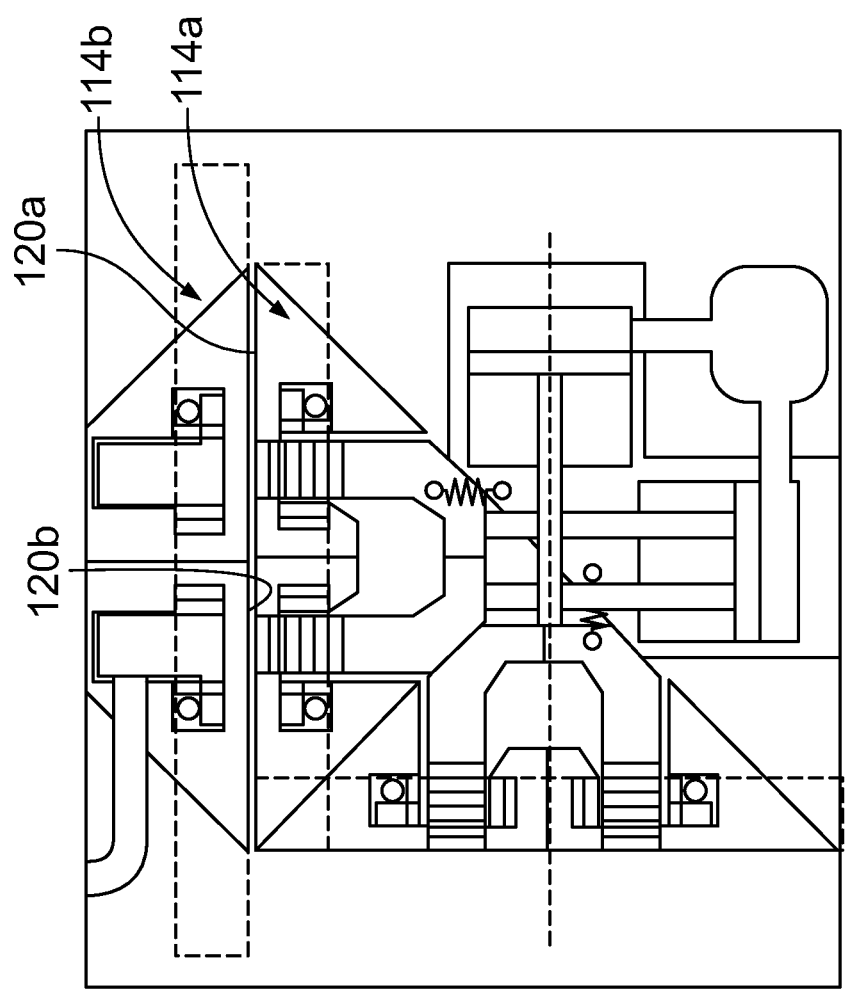
FIG. 11 illustrates a cross-sectional view of the first locking interface of the first securing lock through line 9-9 of FIG. 6 abutting the second locking interface of the second securing lock, according to an example of the present disclosure.

FIG. 11 illustrates a cross-sectional view of the first locking interface 120a of the first securing lock 114b through line 9-9 of FIG. 6 abutting the second locking interface 120b of the second securing lock 114b, according to an example of the present disclosure. FIG. 12 illustrates a cross-sectional view of the first locking interface 120a of the first securing lock 114b through line 10-10 of FIG. 6 abutting the second locking interface 120b of the second securing lock 114b. Referring to FIGS. 5-12, the protrusions 125 are compressed into counterpart recesses 126 until the first locking interface 120a contacts the second locking interface 120b, such that each provides a bearing stress therebetween. The stiffness of the protrusions 125 is configured to provide a desired amount of pre-stress bearing force.

Figure 14:
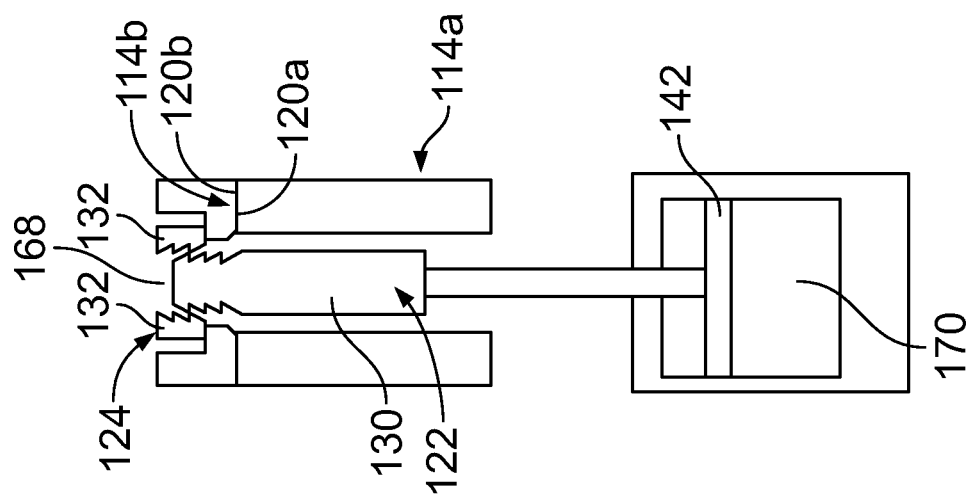
FIG. 14 illustrates a cross-sectional view of the first locking interface of the first securing lock through line 10-10 of FIG. 6 abutting the second locking interface of the second securing lock in which a tooth of the first locking interface is disposed between jaws of the second locking interface, according to an example of the present disclosure.
Figure 13:
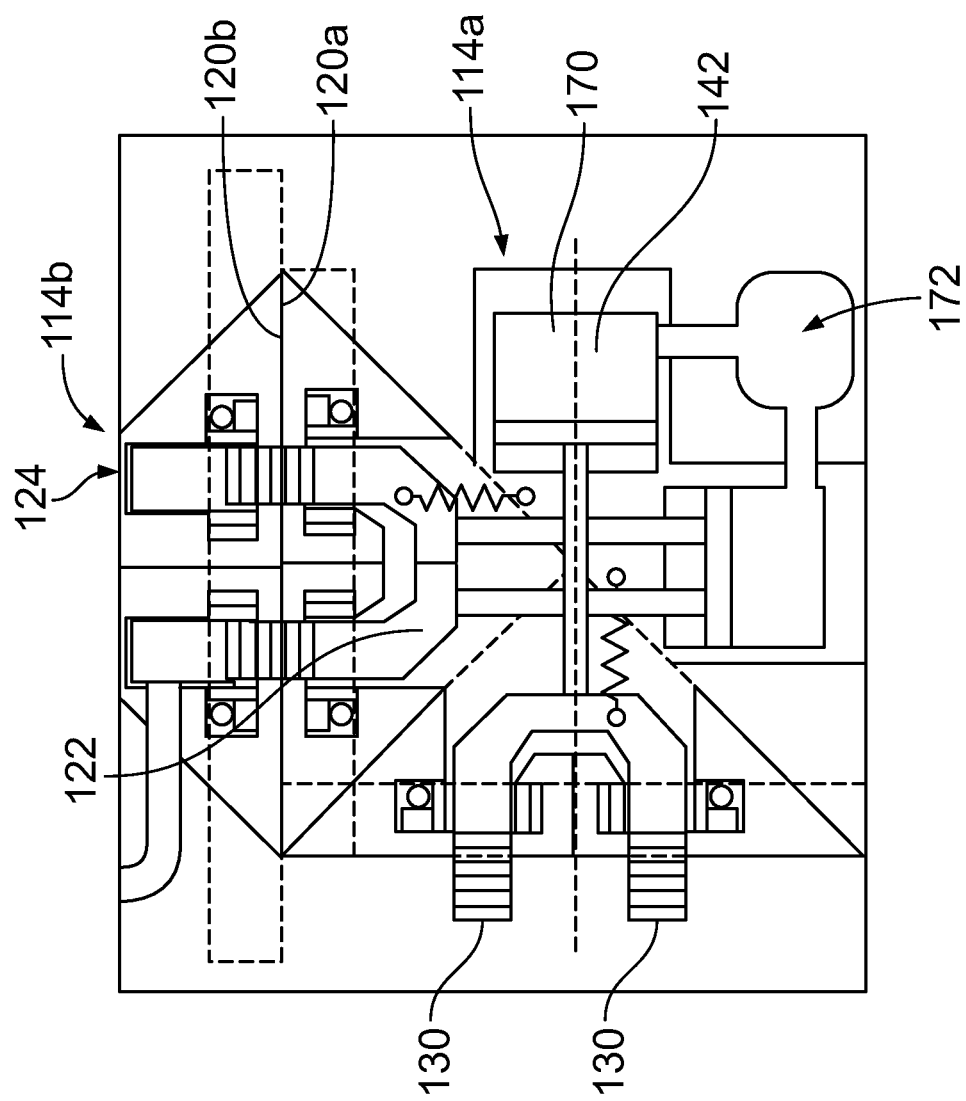
FIG. 13 illustrates a cross-sectional view of the first locking interface of the first securing lock through line 9-9 of FIG. 6 abutting the second locking interface of the second securing lock in which a tooth of the first locking interface is disposed between jaws of the second locking interface, according to an example of the present disclosure.

FIG. 13 illustrates a cross-sectional view of the first locking interface 120a of the first securing lock 114a through line 9-9 of FIG. 6 abutting the second locking interface 120b of the second securing lock 114b in which a tooth 130 of the first locking interface 120a is disposed between jaws 132 of the second locking interface 114b, according to an example of the present disclosure. FIG. 14 illustrates a cross-sectional view of the first locking interface 120a of the first securing lock 114b through line 10-10 of FIG. 6 abutting the second locking interface 120b of the second securing lock 114b in which the tooth 130 of the first locking interface 120a is disposed between jaws 132 of the second locking interface 120b, according to an example of the present disclosure. Each tooth 130 of each tooth assembly 122 of the first securing lock 114a and the second securing locking 114b is configured to be engaged by counterpart jaws 132 of another securing locking as shown and described.

As shown in FIGS. 13 and 14, the fluid source 172 is operated to provide fluid, such as compressed air, into the fluid chamber 170, thereby disposing the tooth 130 of the first locking interface 120a between two jaws 132 of the second locking interface 120b. The fluid drives the piston 142 such that the tooth 130 protrudes into a gap 168 between the jaws 132.

Referring to FIGS. 6, 13, and 14, the spring 134 tends to hold the jaws 132 in a closed position. However, the outward force applied by the tooth 130 into the jaws assembly 124 of the second locking interface 120b is sufficient to overcome the resistance provided by the spring 134, thereby forcing the jaws 132 into an open position to allow the tooth 130 to extend between the jaws 132. The pressure of the fluid, such as compressed air, and the spring constant of the spring 134 are configured to allow for such movement.

Figure 16:
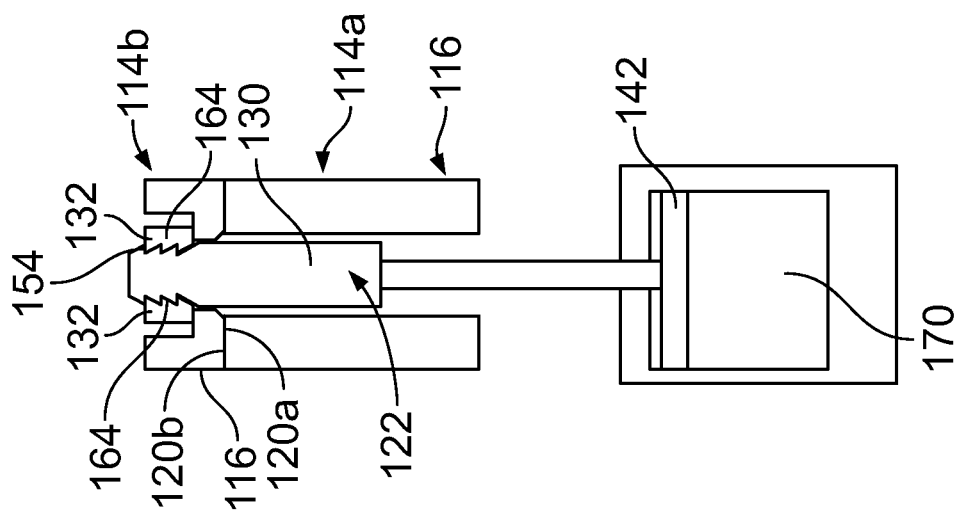
FIG. 16 illustrates a cross-sectional view of the first locking interface of the first securing lock through line 10-10 of FIG. 6 abutting the second locking interface of the second securing lock in which the jaws of the second locking interface lock onto the tooth of the first locking interface, according to an example of the present disclosure.
Figure 15:
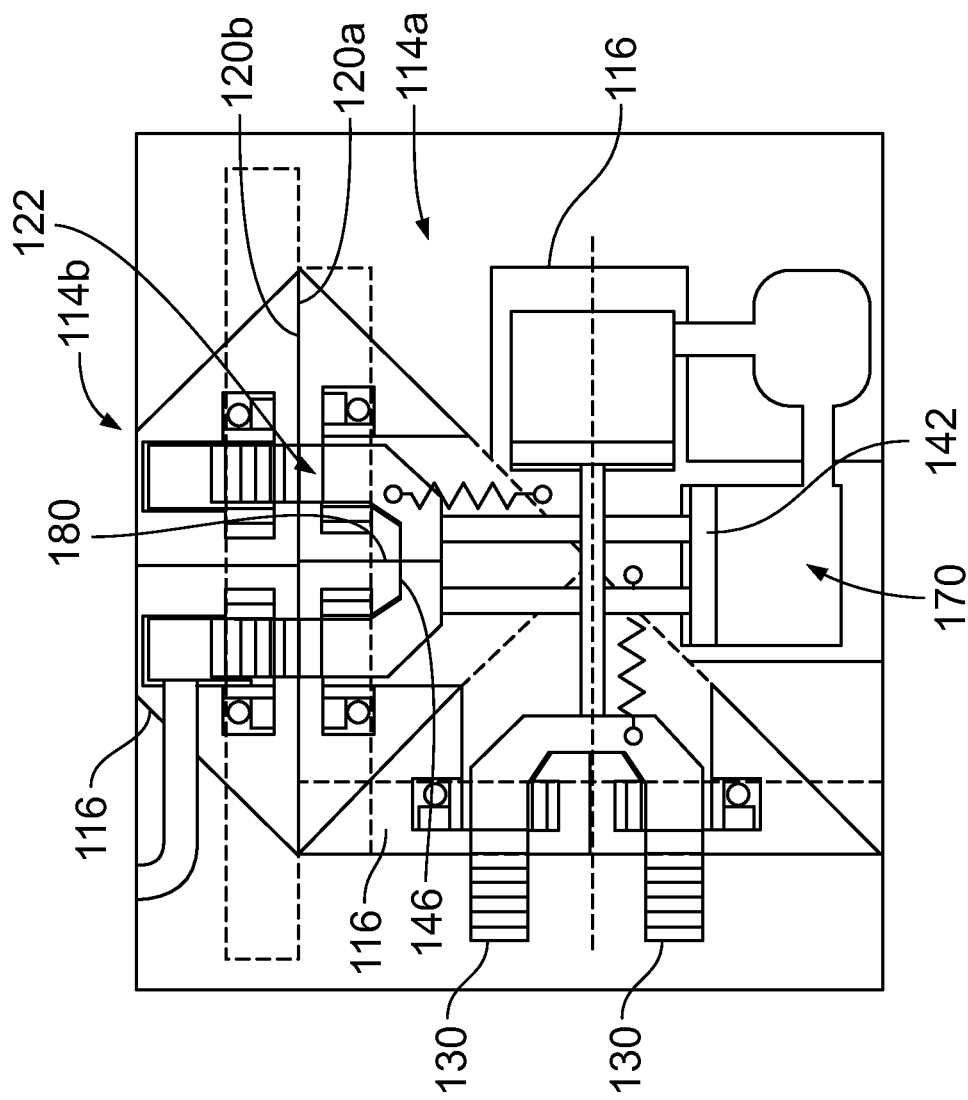
FIG. 15 illustrates a cross-sectional view of the first locking interface of the first securing lock through line 9-9 of FIG. 6 abutting the second locking interface of the second securing lock in which the jaws of the second locking interface lock onto the tooth of the first locking interface, according to an example of the present disclosure.

FIG. 15 illustrates a cross-sectional view of the first locking interface 120a of the first securing lock 114a through line 9-9 of FIG. 6 abutting the second locking interface 120b of the second securing lock 114b in which the jaws 132 of the second locking interface 120b lock onto the tooth 130 of the first locking interface 120a, according to an example of the present disclosure. FIG. 16 illustrates a cross-sectional view of the first locking interface 120a of the first securing lock 114a through line 10-10 of FIG. 6 abutting the second locking interface 120b of the second securing lock 114b in which the jaws 132 of the second locking interface 120b lock onto the tooth 130 of the first locking interface 120a, according to an example of the present disclosure. Referring to FIGS. 15 and 16, with increased fluid pressure driving the tooth assembly 122 of the first locking interface 120a toward the second locking interface 120b, the bearing stop 146 of the tooth assembly 122 abuts against a reciprocal stop 180 of the housing 116 of the first securing lock 114a, thereby halting further outward motion.

When the tooth 130 of the first locking interface 120a reaches its maximum extent into the gap 168 between the jaws 132 (such as within a jaws cavity), the jaws 132 of the second locking interface 120b clamp onto the tooth 139 because of the force resulting from spring 134 (shown in FIG. 6). The serrations 154 of the tooth 130 lock onto the (corresponding) serrations 164 of the jaws 132, thereby providing a secure locked connection. Again, each of the teeth 130 of each of the securing locks 114a, 114b can be configured to be engaged by counterpart jaws 132 in such a manner.

Referring to FIGS. 2-16, for the jaws 132 and teeth 130 to prevent the containers 100a and 100b from separating, the jaws 132 clamp onto the teeth 130 with sufficient force to prevent the jaws 132 from separating. In contrast to a standard bolt thread in which there is a radial force between the threads as the bolt is put into tension or compression, the profile of the serrations 154 and 164 can be configured to minimize such outward force.

After the jaws 132 securely lock onto the tooth 130, as shown in FIG. 16, for example, the fluid pressure is released. Because the jaws 132 are firmly clamped and locked to the tooth 130, there is no need to continue applying fluid pressure.

Referring to FIGS. 6, 15, and 16, with the fluid force no longer acting on the jaws 132, the protrusions 125 are now free to apply force that tends to separate the locking interface 120a and 120b, by virtue of the protrusions being compressed. Such separating force puts the teeth 130 in at least some pre-tension, which helps prevent movement (rattling) of the containers 100a and 100b (shown in FIGS. 2-4) in relation to one another. Under flight loads, for example, force attempting to pull the containers 100a and 100b apart is resisted by the strength of the teeth 130 and the jaws 132, with each bearing against surfaces internal to the respective housings 116.

Figure 17:
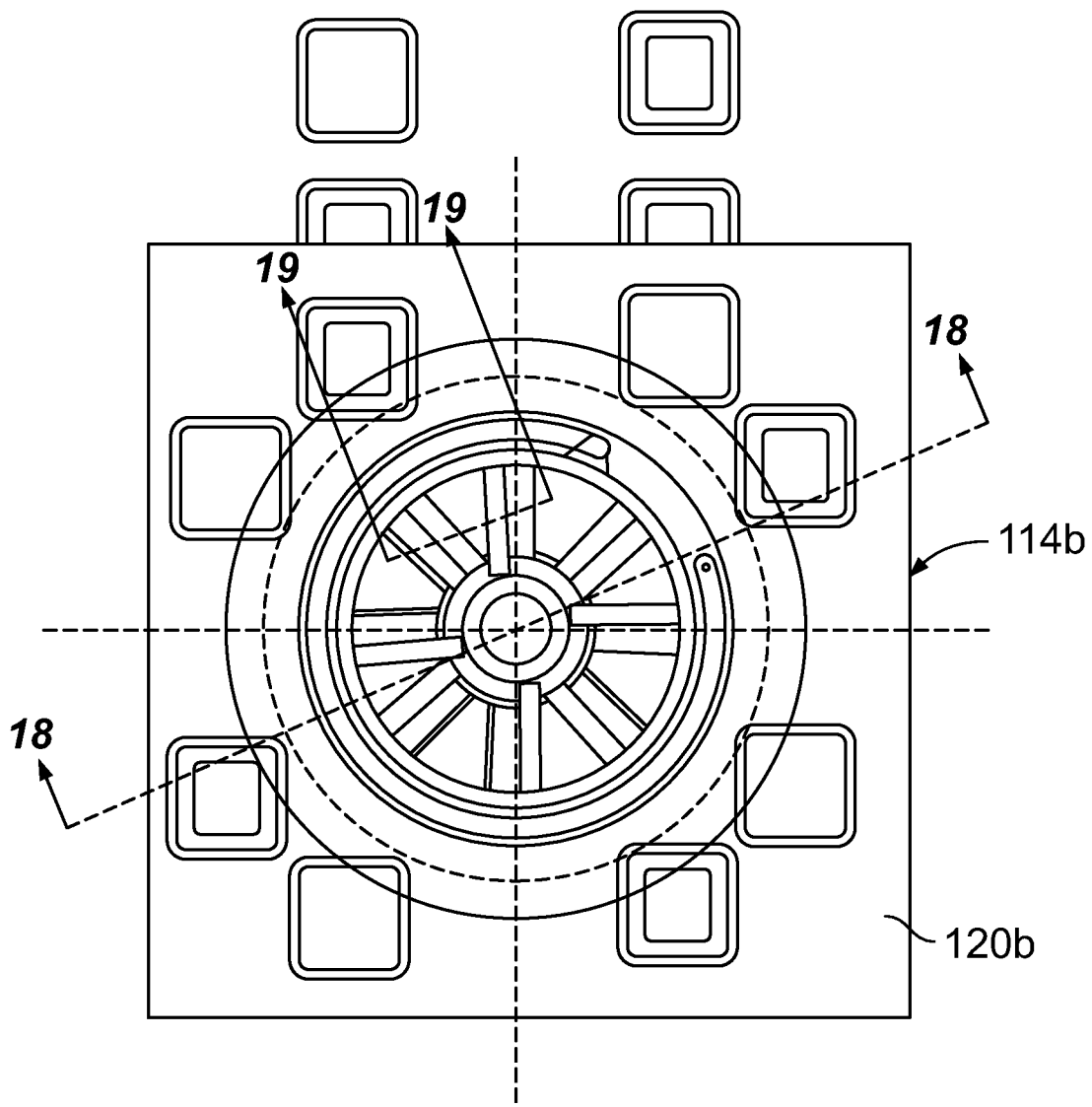
FIG. 17 illustrates a front view of a locking interface according to an example of the present disclosure.
Figure 18:
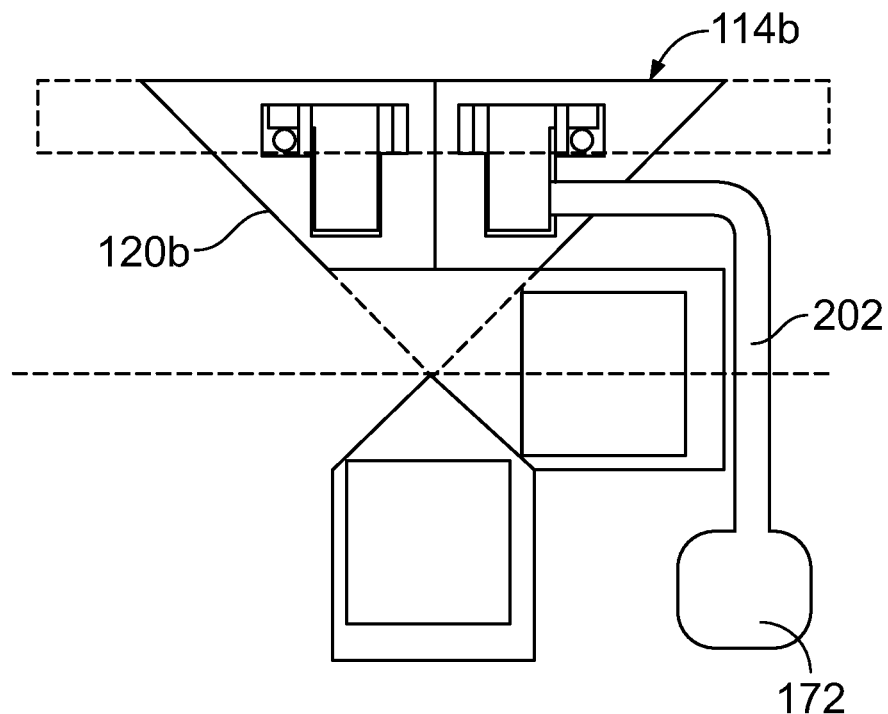
FIG. 18 illustrates a cross-sectional view of the second locking interface of the second securing lock through line 18-18 of FIG. 17, according to an example of the present disclosure.
Figure 19:
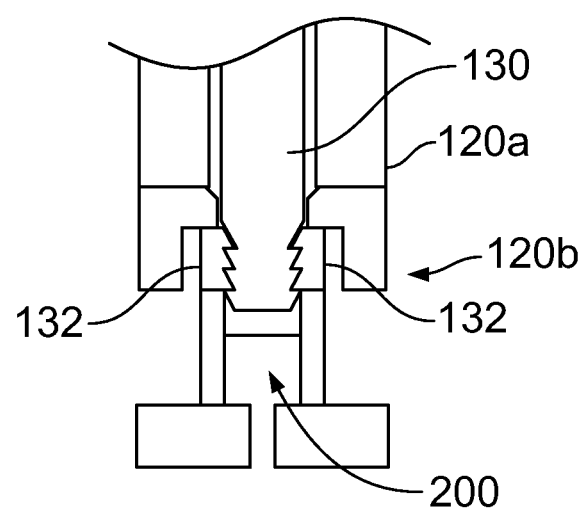
FIG. 19 illustrate a cross-sectional view of the second locking interface of the second securing lock through line 19-19 of FIG. 17 abutting the first locking interface of the first securing lock, according to an example of the present disclosure.

FIG. 17 illustrates a front view of the second locking interface 120b according to an example of the present disclosure. FIG. 18 illustrates a cross-sectional view of the second locking interface 120b of the second securing lock 114b through line 18-18 of FIG. 17, according to an example of the present disclosure. FIG. 19 illustrate a cross-sectional view of the second locking interface 120b of the second securing lock 114b through line 19-19 of FIG. 17 abutting the first locking interface 120a of the first securing lock 114a. Referring to FIGS. 17-19, in at least one example, the fluid source 172 for each of the securing locks, such as the securing lock 114b, is also in fluid communication with a flexible fluid retainer 200, such as a bladder, via one or more fluid conduits 202. The fluid retainer 200 is disposed between jaws 132. In at least one example, a fluid retainer 200, or at least a portion thereof, can be disposed between neighboring and/or paired jaws 132 that are configured to engage a tooth 130, as described.

Referring to FIGS. 2-19, in order to unlock and disconnect the first container 100a from the second container 100b, the fluid source 172 is operated to deliver fluid into the fluid retainer 200, thereby expanding the fluid retainer 200, and forcing the jaws 132 apart. As the jaws 132 move apart, the jaws 132 disengage from the tooth 130, thereby unlocking the first locking interface 120a from the second locking interface 120b. The containers 100a and 100b can then be separated, and the fluid source 172 can then be disengaged so that the fluid within the fluid retainer 200 releases, and the jaws 132 move back toward one another. The springs 176 (as shown in FIG. 9, for example), then pull the teeth 130 rearwardly into respective housings 116 so that they no longer are disposed between jaws 132. The protrusions 125 can further assist in separating the first container 100a from the second container 100b after the jaws 132 disengage from the teeth 130, due to expansion, for example.

Figure 20:
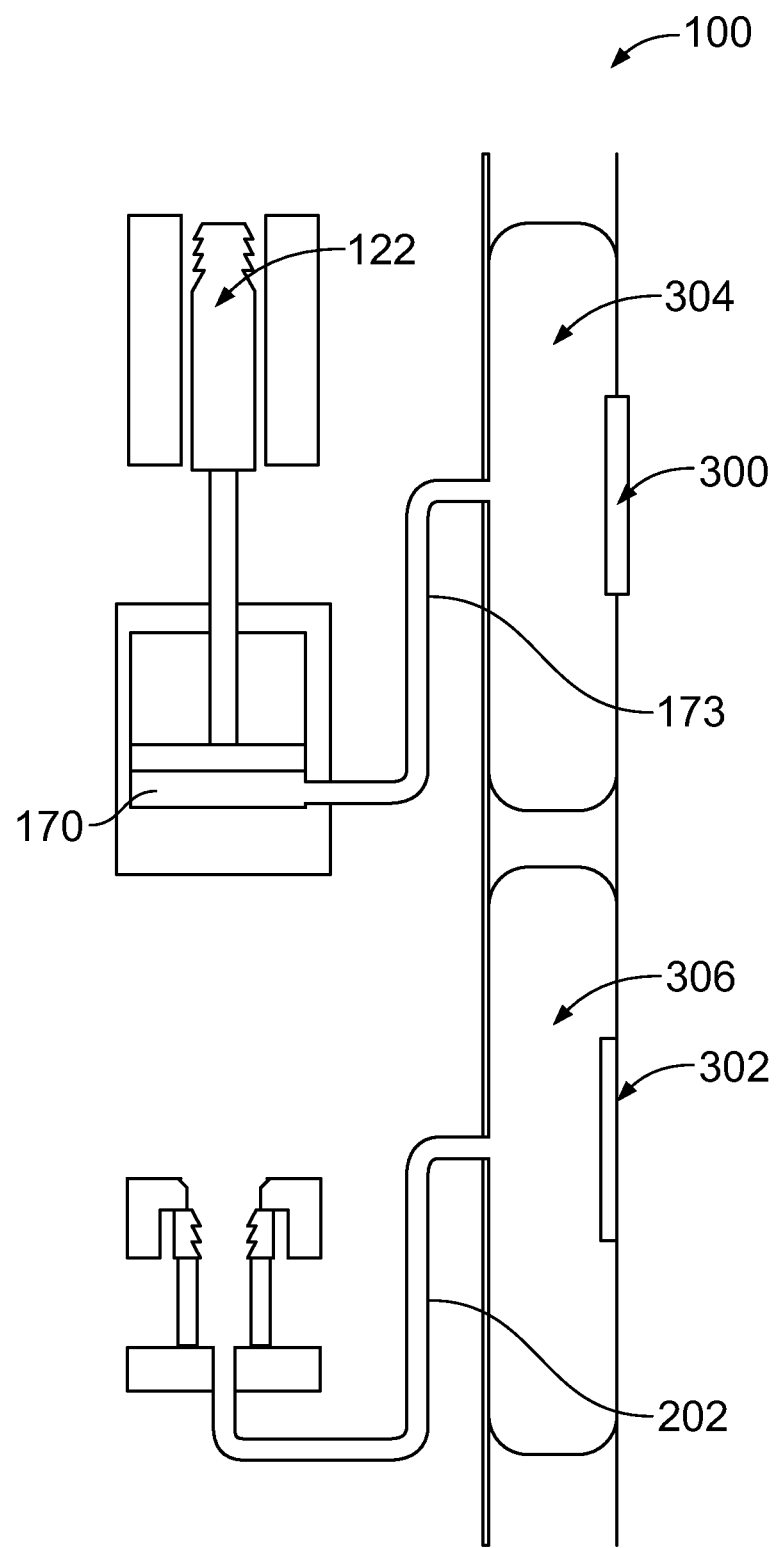
FIG. 20 illustrates a schematic diagram of a container, according to an example of the present disclosure.

FIG. 20 illustrates a schematic diagram of a container 100, according to an example of the present disclosure. Referring to FIGS. 2, 3, and 20, a container 100 can include a teeth engagement device 300, such as a button with associated indicia, and a jaws disengagement device 302, such as a button with associated indicia. The indicia can be a graphic, text, and/or the like that is configured to indicate the nature of the engagement device. The teeth engagement device 300 is coupled to a fluid source or reservoir 304 that contains the fluid. Similarly, the jaws disengagement device 302 is coupled to a fluid source or reservoir that contains the fluid. The fluid reservoir 304 is coupled to one or more fluid conduits 173 that are configured to deliver fluid to one or more fluid chambers 170, as described herein. Similarly, the fluid reservoir 306 is coupled to one or more fluid conduits 202 that are configured to deliver fluid to fluid retainer 200, as described herein. By pushing the teeth engagement device 300 and the jaws disengagement device 302, fluid can be selectively delivered as desired and explained herein. In at least one example, the fluid reservoirs 304 and 306 can be flexible bladders or other such retainer that retain hydraulic fluid. Optionally, the fluid reservoirs can be configured to retain gas, such as air. The fluid reservoirs may or may not be connectable to a source of compressed gas, such as compressed air.

In at least one example, when the retained fluid is a hydraulic fluid, such as water, the fluid can be dispersed throughout a fluid circuit defined by the fluid reservoirs and respective fluid chambers. As such, as the engagement devices are pressed, fluid is forced out of the reservoirs in to the respective fluid chambers, thereby providing the operations as described herein.

In at least one example, the engagement devices 300 and 302 can include an electronic display, such as a screen, one or more indicators (such as light emitting diodes), and/or the like that are configured to show a locking state (such as locked, unlocked, or the like). As another example, the engagement devices 300 and 302 can be configured to emit an audio signal to indicate a locking status.

Referring to FIGS. 1-20, as described herein, examples of the present disclosure provide a securing lock 114 for a container 100. The securing lock 114 includes one or more locking interfaces 120. At least one of the locking interfaces 120 includes a tooth assembly 122 having one or more teeth 130, and a jaws assembly 124 having one or more jaws 132. The one or more teeth 130 are configured to be engaged by one or more other jaws of another securing lock of another container to secure the container 100 to the other container. Further, the one or more jaws 132 are configured to engage one or more other teeth of another securing lock of another container to secure the container to the other container. The one or more locking interfaces 120 can be integrally formed with the container 100. Optionally, the one or more locking interfaces 120 can be separately secured to the container 100.

Figure 21:
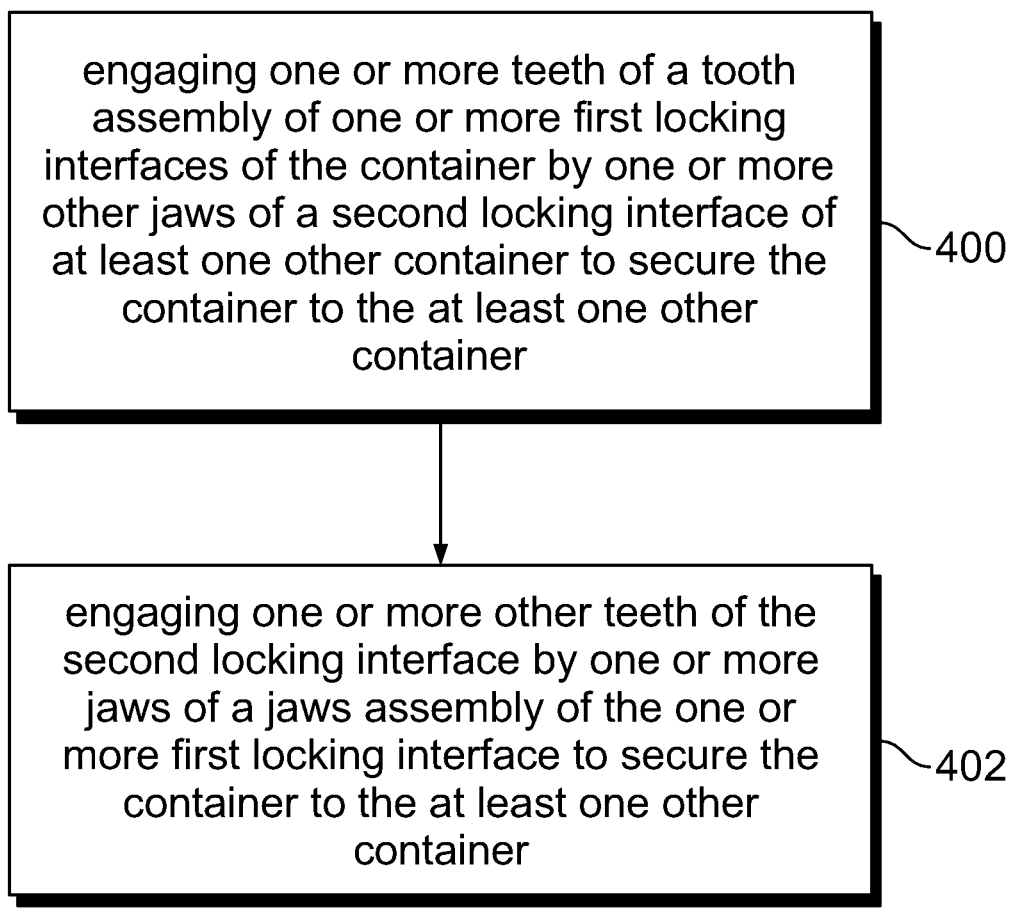
FIG. 21 illustrates a flow chart of a method for securing a container to at least one other container, according to an example of the present disclosure.

FIG. 21 illustrates a flow chart of a method for securing a container to at least one other container, according to an example of the present disclosure. The method includes engaging, at 400, one or more teeth of a tooth assembly of one or more first locking interfaces of the container by one or more other jaws of a second locking interface of at least one other container to secure the container to the at least one other container. The method also includes engaging, at 402, one or more other teeth of the second locking interface by one or more jaws of a jaws assembly of the one or more first locking interface to secure the container to the at least one other container. In at least one example, the method also includes delivering fluid from one or more fluid sources to move one or both of the tooth assembly or the jaws assembly.

Further, the disclosure comprises examples according to the following clauses:

Clause 1. A securing lock for a cargo support apparatus (such as a container, pallet or other cargo holding apparatus), the securing lock comprising:
one or more first locking interfaces, wherein the one or more first locking interfaces comprise:
a tooth assembly including one or more teeth; and
a jaws assembly including one or more jaws,
wherein the one or more teeth are configured to be engaged by one or more other jaws of a second locking interface of at least one other cargo support apparatus (such as another container, pallet, or other cargo holding apparatus) to secure the container to the at least one other container, and
wherein the one or more jaws are configured to engage one or more other teeth of the second locking interface of the at least one other container to secure the container to the at least one other container.

Clause 2. The securing lock of Clause 1, wherein the one or more first locking interfaces are disposed proximate to one or more corners of the container.

Clause 3. The securing lock of Clauses 1 or 2, wherein the one or more locking interfaces are integrally formed with the container.

Clause 4. The securing lock of any of Clauses 1-3, wherein the one or more locking interfaces comprise at least three locking interfaces.

Clause 5. The securing lock of any of Clauses 1-4, wherein the one or more locking interfaces further comprise one or more protrusions and one or more recesses, wherein the one or more protrusions and the one or more recesses are configured to cooperate with other one or more recesses and other one or more protrusions, respectively, of the second locking interface.

Clause 6. The securing lock of Clause 5, wherein the tooth assembly and the jaws assembly are inside an outer perimeter defined by the one or more protrusions and the one or more recesses.

Clause 7. The securing lock of any of Clauses 1-6, wherein the one or more locking interfaces further comprise a rotational spring rotationally coupled to the one or more jaws.

Clause 8. The securing lock of any of Clauses 1-7, wherein the tooth assembly further comprises:
  a piston; and
  a yoke coupled to the piston,
  wherein the one or more teeth extend outwardly from the yoke.

Clause 9. The securing lock of any of Clauses 1-8, wherein the one or more teeth include serrations.

Clause 10. The securing lock of any of Clauses 1-9, wherein the jaws assembly comprises:
  an outer ring; and
  an inner ring,
  wherein the one or more jaws radially extend between the outer ring and the inner ring.

Clause 11. The securing lock of Clause 10, wherein the one or more jaws include serrations.

Clause 12. The securing lock of any of Clauses 1-11, wherein the one or more teeth are disposed in one or more gaps separating neighboring jaws.

Clause 13. The securing lock of any of Clauses 1-12, wherein the one or more locking interfaces further comprise one or more fluid sources that are configured to deliver fluid to move one or both of the tooth assembly or the jaws assembly.

Clause 14. The securing lock of Clause 13, wherein the one or more fluid sources are configured to deliver the fluid to move both the tooth assembly and the jaws assembly.

Clause 15. The securing lock of Clauses 13 or 14, wherein the fluid source is one or both of a source of compressed gas, or a hydraulic fluid reservoir.

Clause 16. The securing lock of any of Clauses 13-15, wherein the container comprises:
  a teeth engagement device operatively coupled to the one or more fluid sources; and
  a jaws disengagement device operatively coupled to the one or more fluid sources.

Clause 17. The securing lock of any of Clauses 1-16, wherein the one or more first locking interfaces further comprise one or more springs that connect the one or more teeth to one or more portions of a housing.

Clause 18. A method for securing a cargo support apparatus to at least one other cargo support apparatus, the method comprising:
  engaging one or more teeth of a tooth assembly of one or more first locking interfaces of the cargo support apparatus by one or more other jaws of a second locking interface of at least one other cargo support apparatus to secure the cargo support apparatus to the at least one other cargo support apparatus; and
  engaging one or more other teeth of the second locking interface by one or more jaws of a jaws assembly of the one or more first locking interface to secure the cargo support apparatus to the at least one other cargo support apparatus.

Clause 19. The method of Clause 18, further comprising delivering fluid from one or more fluid sources to move one or both of the tooth assembly or the jaws assembly.

Clause 20. A cargo support apparatus comprising:
  a securing lock including one or more first locking interfaces, wherein the one or more first locking interfaces comprise:
    a tooth assembly including one or more teeth, wherein the one or more teeth include first serrations;
    a jaws assembly including one or more jaws, wherein the one or more jaws include second serrations, wherein the one or more teeth are configured to be engaged by one or more other jaws of a second locking interface of at least one other cargo support apparatus to secure the cargo support apparatus to the at least one other cargo support apparatus, and wherein the one or more jaws are configured to engage one or more other teeth of the second locking interface of the at least one other cargo support apparatus to secure the cargo support apparatus to the at least one other cargo support apparatus;
    one or more protrusions and one or more recesses, wherein the one or more protrusions and the one or more recesses are configured to cooperate with other one or more recesses and other one or more protrusions, respectively, of the second locking interface, and wherein the tooth assembly and the jaws assembly are inside an outer perimeter defined by the one or more protrusions and the one or more recesses; and
    a rotational spring rotationally coupled to the one or more jaws,
  wherein one or more fluid sources that are configured to deliver fluid to move the tooth assembly and the jaws assembly.

As described herein, examples of the present disclosure provide efficient and effective systems and methods for modularly coupling cargo containers together.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A securing lock for a cargo support apparatus, the securing lock comprising:
   one or more first locking interfaces, wherein the one or more first locking interfaces comprise:
      a first tooth assembly including one or more first teeth; and
      a first jaws assembly including one or more first jaws,
   wherein the one or more first teeth are configured to be engaged by one or more second jaws of a second locking interface of at least one other cargo support apparatus to secure the cargo support apparatus to the at least one other cargo support apparatus, and
   wherein the one or more first jaws are configured to engage one or more second teeth of the second locking interface of the at least one other cargo support apparatus to secure the cargo support apparatus to the at least one other cargo support apparatus.

2. The securing lock of claim 1, wherein the one or more first locking interfaces are disposed proximate to one or more corners of the cargo support apparatus.

3. The securing lock of claim 1, wherein the one or more first locking interfaces are integrally formed with the cargo support apparatus.

4. The securing lock of claim 1, wherein the one or more first locking interfaces comprise at least three first locking interfaces.

5. The securing lock of claim 1, wherein the one or more first locking interfaces further comprise one or more first protrusions and one or more first recesses, wherein the one or more first protrusions and the one or more first recesses are configured to cooperate with one or more second recesses and one or more second protrusions, respectively, of the second locking interface.

6. The securing lock of claim 5, wherein the first tooth assembly and the first jaws assembly are inside an outer perimeter defined by the one or more first protrusions and the one or more first recesses.

7. The securing lock of claim 1, wherein the one or more first locking interfaces further comprise a rotational spring rotationally coupled to the one or more first jaws.

8. The securing lock of claim 1, wherein the first tooth assembly further comprises:
   a piston; and
   a yoke coupled to the piston,
   wherein the one or more first teeth extend outwardly from the yoke.

9. The securing lock of claim 1, wherein the one or more first teeth include serrations.

10. The securing lock of claim 1, wherein the first jaws assembly comprises:
    an outer ring; and
    an inner ring,
    wherein the one or more first jaws radially extend between the outer ring and the inner ring.

11. The securing lock of claim 10, wherein the one or more first jaws include serrations.

12. The securing lock of claim 1, wherein the one or more first teeth are disposed in one or more gaps separating neighboring jaws of the one or more first jaws.

13. The securing lock of claim 1, further comprising one or more fluid sources that are configured to deliver fluid to move one or both of the first tooth assembly or the first jaws assembly.

14. The securing lock of claim 13, wherein the one or more fluid sources are configured to deliver the fluid to move both the first tooth assembly and the first jaws assembly.

15. The securing lock of claim 13, wherein the fluid source is one or both of a source of compressed gas, or a hydraulic fluid reservoir.

16. The securing lock of claim 13, wherein the container comprises:
    a teeth engagement device operatively coupled to the one or more fluid sources; and
    a jaws disengagement device operatively coupled to the one or more fluid sources.

17. The securing lock of claim 1, wherein the one or more first locking interfaces further comprise one or more first springs that connect the one or more first teeth to one or more portions of a housing.

18. A method for securing a cargo support apparatus to at least one other cargo support apparatus, the method comprising:
    engaging one or more first teeth of a first tooth assembly of one or more first locking interfaces of the cargo support apparatus by one or more second jaws of a second locking interface of at least one other cargo support apparatus to secure the cargo support apparatus to the at least one other cargo support apparatus; and
    engaging one or more second teeth of the second locking interface by one or more first jaws of a first jaws assembly of the one or more first locking interface to secure the cargo support apparatus to the at least one other cargo support apparatus.

19. The method of claim 18, further comprising delivering fluid from one or more fluid sources to move one or both of the first tooth assembly or the first jaws assembly.

20. A cargo support apparatus comprising:
- a securing lock including one or more first locking interfaces, wherein the one or more first locking interfaces comprise:
  - a first tooth assembly including one or more first teeth, wherein the one or more first teeth include first serrations;
  - a first jaws assembly including one or more first jaws, wherein the one or more first jaws include second serrations, wherein the one or more first teeth are configured to be engaged by one or more second jaws of a second locking interface of at least one other cargo support apparatus to secure the container to the at least one other cargo support apparatus, and wherein the one or more first jaws are configured to engage one or more second teeth of the second locking interface of the at least one other cargo support apparatus to secure the cargo support apparatus to the at least one other cargo support apparatus;
  - one or more first protrusions and one or more first recesses, wherein the one or more first protrusions and the one or more first recesses are configured to cooperate with one or more second recesses and one or more second protrusions, respectively, of the second locking interface, and wherein the first tooth assembly and the first jaws assembly are inside an outer perimeter defined by the one or more first protrusions and the one or more first recesses; and
  - a rotational spring rotationally coupled to the one or more first jaws,
- wherein one or more fluid sources are configured to deliver fluid to move the first tooth assembly and the first jaws assembly.

* * * * *